United States Patent
Carey

[15] 3,664,441
[45] May 23, 1972

[54] CONCENTRIC PIPE DRILL STRING

[72] Inventor: Paul P. Carey, Houston, Tex.
[73] Assignee: Carey Machine and Supply Company, Houston, Tex.
[22] Filed: June 1, 1970
[21] Appl. No.: 42,238

[52] U.S. Cl.............................................175/215, 285/133
[51] Int. Cl. ...................................E21b 43/00, E21b 21/00
[58] Field of Search..................175/215, 213, 321; 285/133, 285/133 A

[56] References Cited

UNITED STATES PATENTS

| | | | |
|---|---|---|---|
| 3,065,807 | 11/1962 | Wells | 285/133 A |
| 1,862,260 | 6/1932 | Edmunds | 285/133 A |
| 1,024,310 | 4/1912 | Canfield | 175/215 X |
| 1,981,863 | 11/1934 | Harris | 285/133 A |
| 3,096,103 | 7/1963 | Murphy | 175/215 X |
| 3,273,660 | 9/1966 | Jackson et al | 175/215 X |
| 3,471,177 | 10/1969 | Garrett et al | 175/215 X |

*Primary Examiner*—David H. Brown
*Attorney*—Michael P. Breston

[57] ABSTRACT

This invention contemplates stands of concentric drill pipes with tool joints which are disconnectable from the pipes for use in oil well drilling. The removable tool joints provide means for supporting and maintaining the inner tube in coaxial relationship within the surrounding outer pipe within each stand.

1 Claim, 3 Drawing Figures

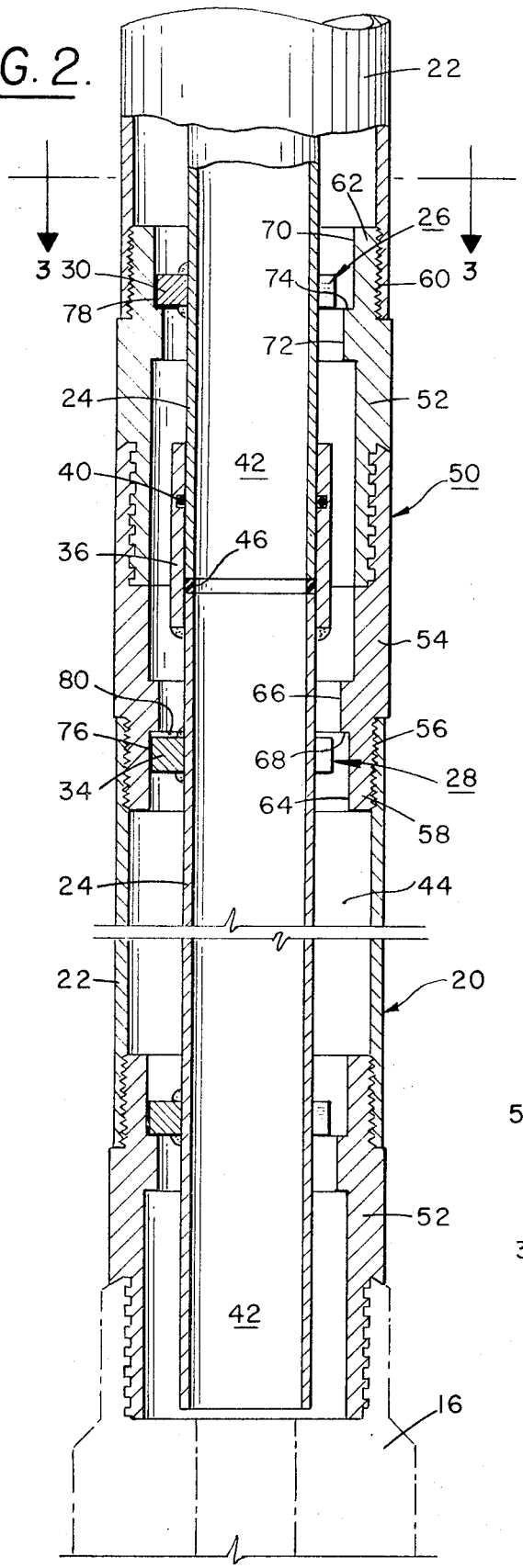
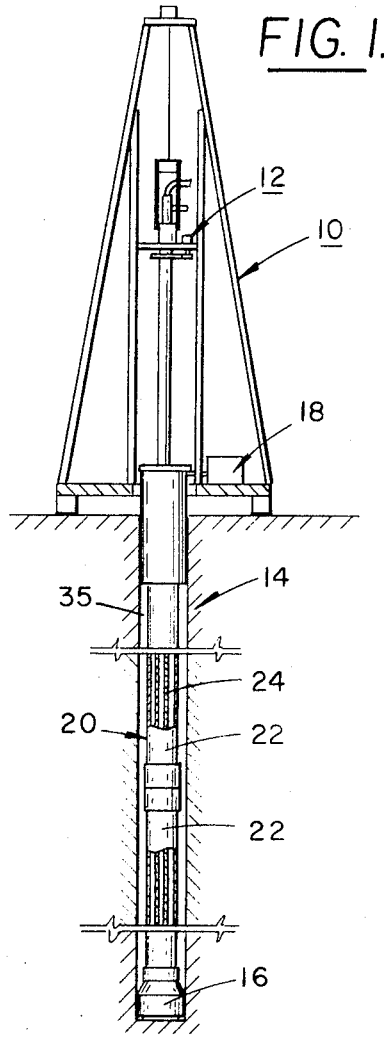
PAUL P. CAREY,
INVENTOR.
BY MICHAEL P. BRESTON,
ATTORNEY.

CONCENTRIC PIPE DRILL STRING

BACKGROUND OF THE INVENTION

Dual-passage pipe strings and their use for drilling oil wells are described in the patent literature, for example, in U.S. Pat. Nos. 2,657,016, 2,850,264, 3,065,807, and 3,208,539. Such known dual-passage pipe strings are made up of pipe stands, each stand having an outer pipe and an inner tube. The dual-passage pipe string is made up by connecting the tool joints of adjacent pipe stands. The inner pipe is supported on a set of radially extending ribs, fixedly secured near the lower end of the inner cylindrical wall of the outer pipe. Another set of radially extending ribs, near the upper end, center the inner tube for coaxial relationship with the outer pipe. Each tool joint forms integral part with its outer pipe.

Accordingly, such known concentric pipe stands are relatively expensive to manufacture and to service. When it is necessary or desirable to replace the inner tube, the outer pipe, or a worn out tool joint, pipe cutting and welding operations are required. Frequently, such operations cannot be made in the field, thereby necessitating the storing of a considerable number of spare dual-pipe stands near the drilling site.

SUMMARY OF THE INVENTION

It is a main object of the present invention to provide new and improved concentric pipe stands which are relatively inexpensive to manufacture and to service particularly in the field. The outer pipes are connnected together by tool joints which are threadably disconnectable from the outer pipe. To one end of each outer pipe is threadably connected a tool joint pin which is designed to screw into the tool joint box of the adjacent outer pipe from which it is also threadedly disconnectable. The drill stem is formed by a great number of pipe stands and constitutes the link between the bit and the surface.

Within each outer pipe stand is concentrically positioned an inner tube. A bottom set of radially extending ribs from the inner tube are supported by an annular shoulder within the tool joint pin, whereas a top set of radially extending ribs center the inner tube within the tool joint box. An annular shoulder within the tool joint box limits the relative displacement, in an axial direction, between the inner tube and the outer pipe. Accordingly, to place or remove the inner tube within or from its concentric outer pipe can be easily accomplished without cutting and welding equipment. Also, the cost of replacing tool joints becomes a fraction of the cost incurred in replacing pipe stands with integral tool joints.

BRIEF DESCRIPTION OF THE DRAWINGS

FIG. 1 schematically shows a dual-passage, well-drilling apparatus using the novel and improved, dual-passage pipe stands;

FIG. 2 is a view in section of a portion of the apparatus shown in FIG. 1; and

FIG. 3 is a sectional view taken along line 3—3 on FIG. 2.

Referring now to the drawings, the well-drilling system using the dual-passage pipe string of this invention includes a derrick 10 having a rotating means 12 for rotating a string 14 of dual-passage pipe stands. At the lower end of string 14 is a bit 16 of any conventional design. A drilling fluid or mud is allowed to circulate through the dual-passage pipe string 14 by a fluid-circulating apparatus, generally indicated as 18. The drilling fluid may be drilling mud, air, water-aerated fluid, and other fluid media.

The dual-passage pipe string 14 includes a plurality of pipe stands 20. Each stand 20 includes an outer cylindrical drill pipe 22 and an inner tube 24. The tube 24 is relatively thin walled and is maintained in coaxial relationship with the outer pipe 22 by means of two sets 26 and 28 of radially extending ribs. The lower set 26 includes at least three ribs or lugs 30, all symmetrically arranged about the longitudinal axis 32, near the bottom end of inner tube 24. The upper set 28 has at least three lugs 34, similarly arranged to lugs 30, near the top end of tube 24. The terms lower and upper, or top or bottom, are with reference to the vertical axis 32 within the borehole 35.

The lugs 30 and 34 are welded to the outer cylindrical wall of inner tube 24. To the upper end of each inner tube 24 is welded a cylindrical sleeve 36 having an inner diameter slightly greater than the outer diameter of inner tube 24. Each sleeve 36 receives in a telescopic connection the lower end of the upwardly adjacent inner tube of the next stand 20. A suitable O-ring 40 in the inner wall of sleeve 36 provides a fluid-tight seal between the inner fluid passage 42 and the outer fluid passage 44. Also, between each adjacent pair of inner tubes is provided an annular, compressible seal member 46. Seal 46 will allow axial relative displacement between adjacent inner tubes 24.

A tool joint 50, having a tool joint pin 52 and a tool joint box 54, connects each adjacent pair of outer pipes 22 together. A threaded connection 56 in the outer wall of a cylindrical extension 58 of box 54 engages the threads in the upper end of pipe 22. Similarly a threaded connection 60 in a cylindrical extension 62 of pin 52 provides a connection with the lower end of pipe 22. The inner cylindrical wall 64 of the cylindrical extension 58 is provided with a reduced diameter section 66 which defines an annular surface 68. Similarly, the cylindrical extension 62 has an inner cylindrical wall 70 and is provided with a reduced diameter section 72 which defines an annular surface 74.

The outer wall 76 of each lug 34 forms a frictional engagement with the inner cylindrical wall 64. The outer wall 78 of each lug 30 is in frictional engagement with the cylindrical wall 70. The lower set 26 of lugs 30 is supported on the annular surface 74, while the annular surface 68 serves as a stop surface to limit the vertical extension of the inner tube 24 due, for example, to temperature differentials within the circulating drilling fluid. Accordingly, differences in elongation between the inner tube 24 and the outer pipe 22 are permissible, so that the inner tube 24 can move relative to the outer pipe 22 as allowed by the length of gap 80 between the upper lugs 34 and the annular stop surface 68. The radially extending lugs 30 and 34 do not appreciably reduce the annular cross section of the outer fluid passage 44.

The assembly of the dual-passage pipe string 14 will be evident from the drawings. The drill bit 16 is connected to the lowermost pin 52. To remove or insert an inner tube 24 from or into its concentric pipe 22, all that is necessary is to uncouple a threadedly secured tool joint. Since such tool joints can be manufactured at a fraction of the cost of drill pipe with integral tool joints, it will be appreciated that the frequent replacement of tool joints is not as expensive as the replacement or servicing of drill pipes in the conventional manner.

While this invention has been described in connection with a specific preferred embodiment, it will be apparent that modifications may be made therein without departing from the scope of the invention as defined in the claims appended hereto.

What I claim is:

1. An apparatus including a plurality of concentric pipe stands removably connected above the drill bit in an oil or gas well drill string, each pipe stand comprising:
   an outer pipe,
   a tool joint pin threadedly secured to one end of said outer pipe,
   a tool joint box threadedly secured to the other end of said outer pipe,
   one of said tool joints defining a support surface,
   the other of said tool joints defining a stop surface;
   an inner tube concentrically arranged within said outer pipe,
   a first set of lugs radially extending from one end of said tube,
   a second set of lugs radially extending from the other end of said tube;
   said first set of lugs being supported by said support surface;

said second set of lugs being limited by said stop surface when said inner tube elongates relative to said outer tube by an excessive amount;

each tool joint comprising a cylindrical sleeve defining an inner cylindrical surface which is in frictional engagement with one set of lugs;

each tube is provided with a cylindrical outer sleeve for telescopically receiving one end of an adjacent tube in said drill string, and a compressible annular seal ring between each pair of adjacent inner tubes.

* * * * *